(12) United States Patent
Lin

(10) Patent No.: US 10,209,748 B2
(45) Date of Patent: Feb. 19, 2019

(54) ELECTRONIC DEVICE WITH HEAT-DISSIPATION STRUCTURE

(71) Applicant: Quanta Computer Inc., Taoyuan (TW)

(72) Inventor: Yun-Jeng Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 0 days.

(21) Appl. No.: 15/675,980

(22) Filed: Aug. 14, 2017

(65) Prior Publication Data

US 2018/0329464 A1 Nov. 15, 2018

(30) Foreign Application Priority Data

May 15, 2017 (TW) .............................. 106115953 A

(51) Int. Cl.
*G06F 1/20* (2006.01)
*G06F 1/16* (2006.01)
*G06F 1/18* (2006.01)

(52) U.S. Cl.
CPC ............ *G06F 1/203* (2013.01); *G06F 1/1681* (2013.01); *G06F 1/181* (2013.01); *G06F 2200/201* (2013.01); *G06F 2200/203* (2013.01)

(58) Field of Classification Search
CPC ........ G06F 1/203; G06F 1/1681; G06F 1/181; G06F 2200/201; G06F 2200/203; G06F 1/20; H01L 23/427; H01L 2224/49175; H05K 7/20272; H05K 7/20254; H05K 7/20336; H05K 5/0226; F28D 15/00
USPC ......... 361/679.47, 699, 679.46, 679.55, 704, 361/688, 689, 707, 676, 679.27; 165/104.33, 80.4, 80.2, 104.28, 157, 168, 165/172, 177; 257/E23.098, 714
See application file for complete search history.

(56) References Cited

U.S. PATENT DOCUMENTS

| | | | | |
|---|---|---|---|---|
| 6,519,147 B2 * | 2/2003 | Nakagawa | ............ | G06F 1/1616 165/80.4 |
| 6,771,498 B2 * | 8/2004 | Wang | ...................... | G06F 1/203 165/104.33 |
| 2005/0180109 A1 * | 8/2005 | Miyazaki | ............ | F28D 15/0241 361/700 |
| 2006/0171113 A1 * | 8/2006 | Wu | ........................ | G06F 1/203 361/679.26 |
| 2009/0279262 A1 * | 11/2009 | Huang | .................... | G06F 1/203 361/704 |

(Continued)

FOREIGN PATENT DOCUMENTS

TW 540290 B 7/2003

OTHER PUBLICATIONS

Chinese language office action dated Apr. 27, 2018, issued in application No. TW 106115953.

*Primary Examiner* — Mandeep S Buttar
(74) *Attorney, Agent, or Firm* — McClure, Qualey & Rodack, LLP

(57) ABSTRACT

An electronic device with a heat-dissipation structure includes a host, a first heat-dissipation tube, a display, a rotation joint, and a second heat-dissipation tube. The first heat-dissipation tube is disposed in the host. The display is pivoted on the host. The display is rotated relative to the host about a rotation axis. The rotation joint is connected to the first heat-dissipation tube. The second heat-dissipation tube is disposed in the display, and connected to the rotation joint. A cooling liquid is filled in the first heat-dissipation tube.

13 Claims, 6 Drawing Sheets

(56) References Cited

U.S. PATENT DOCUMENTS

2013/0301213 A1* 11/2013 Senyk .................... G06F 1/203
　　　　　　　　　　　　　　　　　　　　　　　　　361/679.47

* cited by examiner

ELECTRONIC DEVICE WITH HEAT-DISSIPATION STRUCTURE

CROSS-REFERENCE TO RELATED APPLICATIONS

This Application claims priority of Taiwan Patent Application No. 106115953 filed on May 15, 2017, the entirety of which is incorporated by reference herein.

BACKGROUND OF THE INVENTION

Field of the Invention

The present disclosure relates to an electronic device, and in particular to an electronic device with a heat-dissipation structure.

Description of the Related Art

The performance of laptop computers is getting better and better, at the cost of a lot of heat being generated by the processor in the host of the laptop computer. If the heat cannot be exhausted from the host in time, it will lead to the laptop computer not working properly.

It is generally known that one heat dissipation method is to increase the number of heat-dissipation elements, such as fans, heat fins and heat pipes, inside the host. Moreover, heat pipes are utilized to connect the heat source, such as the processor p, to the cooling fins, and fans are used to exhaust the heat of the fins out of the host.

However, the laptop computer will draw more power to run the fans that dissipate the heat. Therefore, the battery time of the laptop computer suffers. Moreover, since the operation of the fan directly or indirectly produces noise, it will decrease the comfort of using laptop computers. Consequently, it would be desirable to provide a solution for improving the heat-dissipation structure of the laptop computer.

BRIEF SUMMARY OF THE INVENTION

The disclosure provides an electronic device with a heat-dissipation structure. The heat-dissipation structure has great heat-dissipation efficiency even when the electronic device excludes fans. Therefore, the length of the battery charge of the electronic device is increased, and the noise generated by fans during the operation of the electronic device is decreased.

The disclosure provides an electronic device with a heat-dissipation structure including a host, a first heat-dissipation tube, a display, a rotation joint, and a second heat-dissipation tube. The first heat-dissipation tube is disposed in the host. The display is pivoted on the host, and the display is rotated about a rotation axis relative to the host. The rotation joint is connected to the first heat-dissipation tube. The second heat-dissipation tube is disposed in the display, and connected to the rotation joint. The cooling liquid is filled in the first heat-dissipation tube.

In some embodiments, the rotation joint includes a first part and a second part. The first part connected to the first heat-dissipation tube. The second part is pivoted on the first part, and connected to the second heat-dissipation tube. The second part is rotated about the rotation axis relative to the first part. The cooling liquid is a refrigerant.

In some embodiments, the second heat-dissipation tube includes a connection section and a ring section. Two ends of the connection section are respectively connected to the rotation joint and the ring section. The ring section extends along curved path.

In some embodiments, the electronic device further includes a heat source and a heat-dissipation element. The heat source is disposed in the host, and connected to the first heat-dissipation tube. When the heat source generates heat, a portion of the cooling liquid is changed to a cooling gas. The cooling gas flows toward the top portion of the second heat-dissipation tube, and the cooling gas located at the top portion of the second heat-dissipation element condenses to the cooling liquid flowing toward the first heat-dissipation tube.

In some embodiments, the heat-dissipation structure further includes a heat-dissipation element connected to the heat source and the first heat-dissipation tube.

In conclusion, the heat-dissipation structure of the disclosure utilizes the second heat-dissipation tube disposed in the display to dissipate the heat by the heat source via the display, so as to increase the heat-dissipation efficiency and reduce the use of fans. Therefore, the length of the battery charge of the electronic device is increased, and the noise generated by fans while the electronic device operating is decreased.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
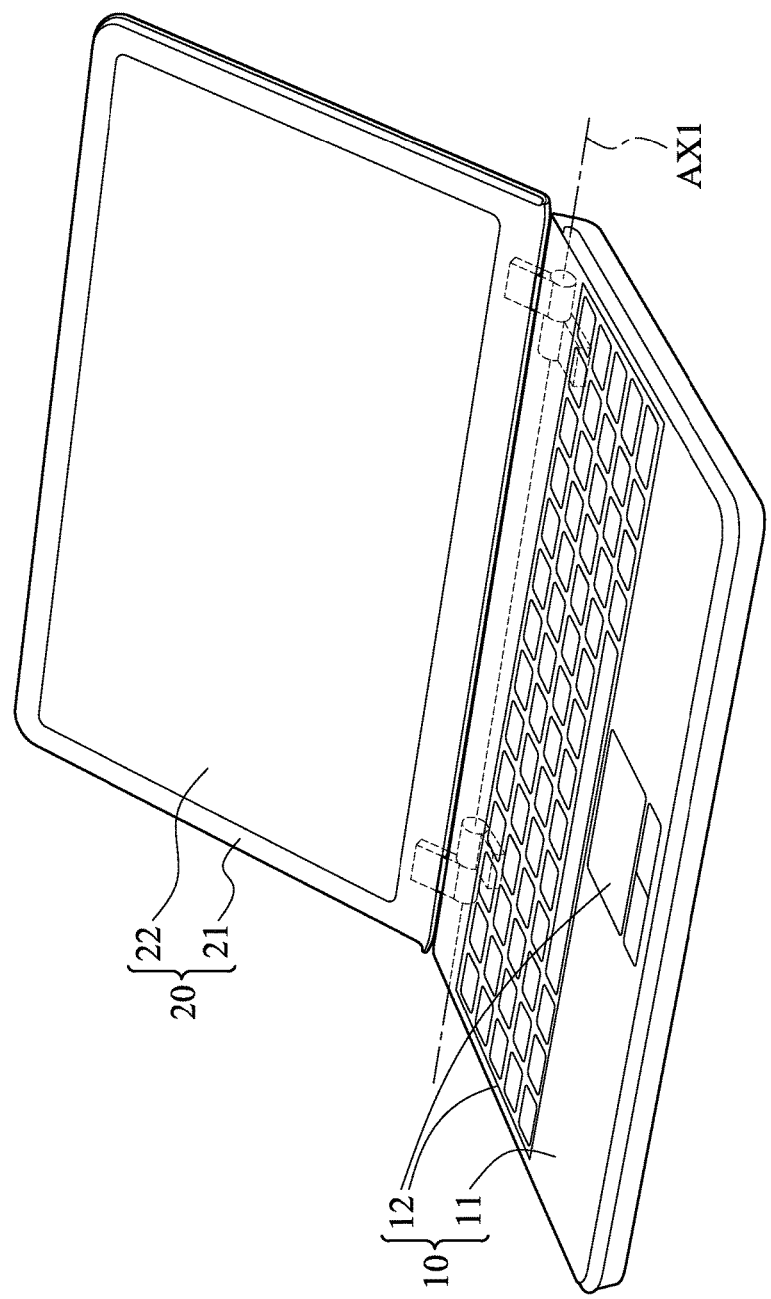
FIGS. 1 and 2 are perspective views of an electronic device in accordance with some embodiments of the disclosure.

The following disclosure provides many different embodiments, or examples, for implementing different features of the present disclosure. Specific examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features, such that the first and second features may not be in direct contact.

Spatially relative terms, such as upper and lower, may be used herein for ease of description to describe one element or feature's relationship to other elements or features as illustrated in the figures. The spatially relative terms are intended to encompass different orientations of the device in use or operation in addition to the orientation depicted in the figures. The shape, size, and thickness depicted in the drawings may not be drawn to scale or may be simplified for clarity of discussion; these drawings are merely intended for illustration.

Figure 2:
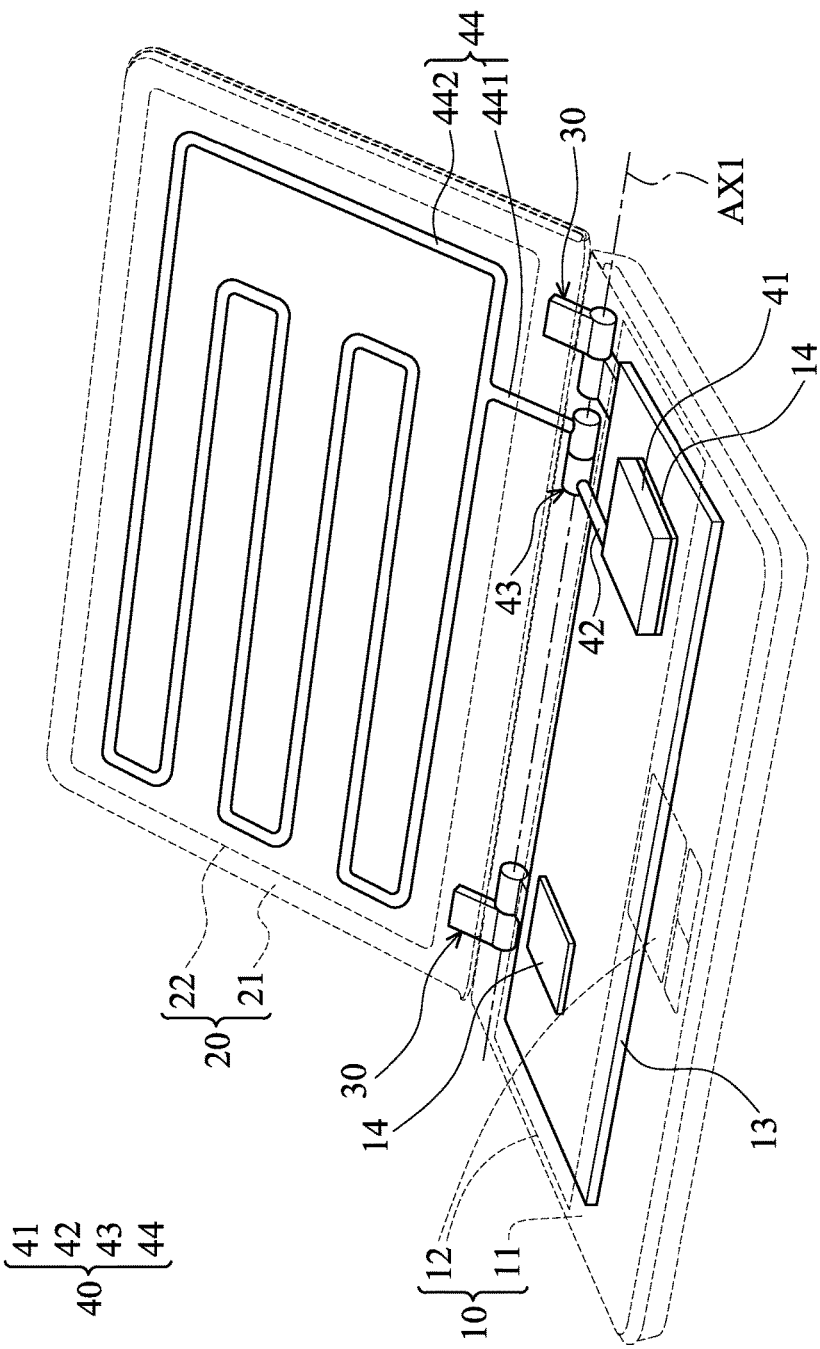

FIGS. 1 and 2 are perspective views of an electronic device 1 in accordance with some embodiments of the disclosure. In this embodiment, the electronic device 1 is a laptop computer. In some embodiments, the electronic device 1 is a portable electronic device or All-in-one (AIO) computer.

The electronic device 1 includes a host 10, a display 20, hinge structures 30, and a heat-dissipation structure 40. The host 10 can be used to perform various kinds of programs, and display the results of the programs on the display 20. In a particular embodiment, the electronic device 1 excludes the hinge structure 30, and the heat-dissipation structure 40 replaces with the function of the hinge structure 30. In other words, the heat-dissipation structure 40 includes the function of a pivot, and can dissipate heat.

The host 10 includes a main housing 11, input modules 12, a motherboard 13, and heat sources 14. The main housing 11 is substantially a plate structure. The input module 12 is disposed on a top surface of the main housing 11. The input module 12 is electrically connected to the motherboard 13. The input module 12 is configured to generate control signals to at least one of the heat source 14 via the motherboard 13. In some embodiments, the input module 12 includes a keyboard, a touch panel, a display touch panel, and/or buttons.

The motherboard 13 is disposed in the main housing 11. The heat source 14 is disposed on the motherboard 13 and located in the main housing 11. In some embodiments, the heat source 14 is a chip, such as a central processing unit (CPU), a display chip, a memory chip, and an input/output chip. When the chip is operating, it generates heat.

The display 20 is pivoted on the host 10. In this embodiment, the display 20 is rotated about a rotation axis AX1 relative to the host 10. The display 20 is substantially a plate structure. The display 20 includes a display housing 21 and a display panel 22. The display panel 22 is disposed on a display surface of the display housing 21.

The display panel 22 is electrically connected to the motherboard 13, and configured to display a picture. In some embodiments, the display panel 22 is a liquid-crystal display panel 22 or an organic light-emitting diode (OLED) panel. In some embodiments, the display panel 22 is a touch panel.

The hinge structure 30 is connected to and located between the host 10 and the display 20. The display 20 is pivoted on the host 10 via the hinge structure 30. The center axis of the hinge structure 30 is located at the rotation axis AX1. Therefore, the display 20 can be inclined or rotated relative to the host 10. In a particular embodiment, the hinge structure 30 is disposed in the host 10 and the display 20.

Figure 3:
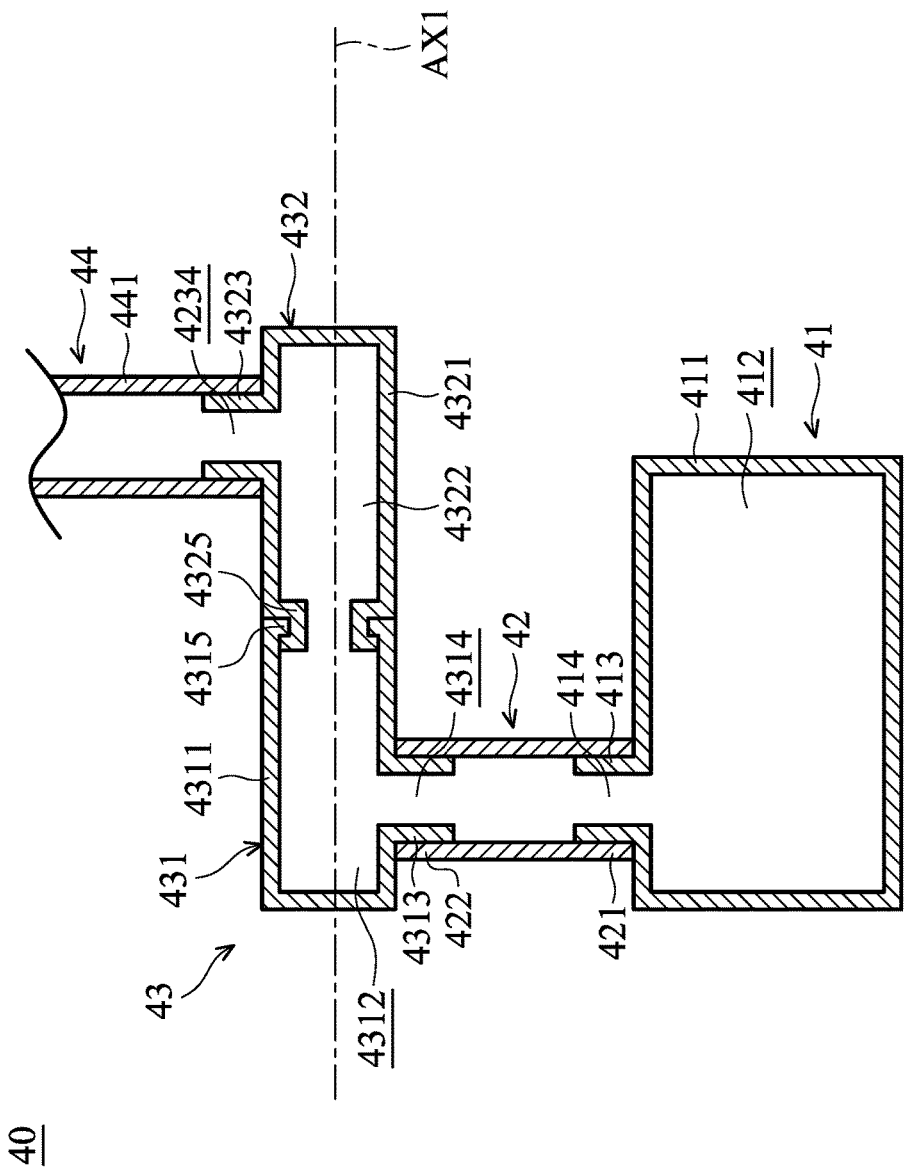
FIG. 3 is a cross-sectional view of the heat-dissipation structure in accordance with some embodiments of the disclosure.

FIG. 3 is a cross-sectional view of the heat-dissipation structure 40 in accordance with some embodiments of the disclosure. The heat-dissipation structure 40 is configured to dissipate the heat generated by the heat source 14. The heat-dissipation structure 40 includes a heat-dissipation element 41, a first heat-dissipation tube 42, a rotation joint 43, and a second heat-dissipation tube 44.

The heat-dissipation element 41 is disposed in the main housing 11, and connected to the heat source 14 and the first heat-dissipation tube 42. The heat-dissipation element 41 may be made from metal materials or thermal conductive materials. The heat-dissipation element 41 includes a heat-dissipation housing 411 and a connection portion 413. The connection portion 413 protrudes over an outer surface of the heat-dissipation housing 411. In this embodiment, the heat-dissipation housing 411 has a receiving chamber 412, and the connection portion 413 has a connection opening 414. The receiving chamber 412 communicates with the connection opening 414.

In a particular embodiment, the heat-dissipation element 41 is substantially a plate structure. A surface of the heat-dissipation element 41 is connected to the heat source 14. The connection portion 413 protrudes over a side of the heat-dissipation element 41.

The first heat-dissipation tube 42 is disposed in the host 10, and connected to the heat-dissipation element 41 and the rotation joint 43. The first heat-dissipation tube 42 is made from metal materials or thermal conductive materials. In some embodiments, the first heat-dissipation tube 42 is hardness, and inflexible. The first heat-dissipation tube 42 extends along a horizontal direction. The first heat-dissipation tube 42 and the heat-dissipation element 41 may be located at the same horizontal surface.

The first heat-dissipation tube 42 has a first end 421 and a second end 422. The first end 421 of the first heat-dissipation tube 42 is connected to the connection portion 413, and the second end 422 of the first heat-dissipation tube 42 is connected to the rotation joint 43.

The rotation joint 43 is located between the host 10 and the display 20. The rotation joint 43 is connected to the first heat-dissipation tube 42 and the second heat-dissipation tube 44. The rotation joint 43 is made from metal materials.

The rotation joint 43 includes a first part 431 and a second part 432. The first part 431 is connected to the first heat-dissipation tube 42. The second part 432 is pivoted on the first part 431, and connected to the second heat-dissipation tube 44. The second part 432 is rotated about the rotation axis AX1 relative to the first part 431.

The first part 431 includes a joint housing 4311, a connection portion 4313, and a pivot portion 4315. The connection portion 4313 protrudes over the outer surface of the joint housing 4311. The connection portion 4313 is connected to the second end 422 of the first heat-dissipation tube 42.

The joint housing 4311 has a receiving chamber 4312, and the connection portion 4313 has a connection opening 4314. The receiving chamber 4312 communicates with the connection opening 4314. Moreover, the connection opening 4314 communicates with the connection opening 414 via the first heat-dissipation tube 42. The pivot portion 4315 is disposed on the joint housing 4311, and pivoted on the second part 432.

The second part 432 includes a joint housing 4321, a connection portion 4323, and a pivot portion 4325. The connection portion 4323 protrudes over the outer surface of the joint housing 4321. The connection portion 4323 is connected to the second heat-dissipation tube 44. The connection portion 4323 of the second part 432 is disposed in the display housing 21 of the display 20.

The joint housing 4321 has a receiving chamber 4322, and the connection portion 4323 has a connection opening 4324. The receiving chamber 4322 communicates with the connection opening 4324 and the receiving chamber 4312. Moreover, the connection opening 4324 communicates with the inner side of the second heat-dissipation tube 44. The pivot portion 4325 is disposed on the joint housing 4321, and pivoted on pivot portion 4315.

The second heat-dissipation tube 44 is disposed in the display 20, and connected to the connection portion 4323 of the rotation joint 43. In this embodiment, the second heat-dissipation tube 44 is located at a rear side of the display panel 22. In other words, the second heat-dissipation tube 44 is located between the display housing 21 and the display panel 22. The second heat-dissipation tube 44 is made from metal materials or thermal conductive materials. In some embodiments, the second heat-dissipation tube 44 is hardness, and is inflexible.

In a particular embodiment, the electronic device 1 excludes the hinge structure 30. The display 20 is rotated or inclined relative the host 10 by the heat-dissipation structure 40.

As shown in FIGS. 1 to 3, a cooling liquid is filled in the heat-dissipation structure 40. In this embodiment, the cooling liquid is filled in the receiving chamber 412 of the heat-dissipation element 41, in the first heat-dissipation tube 42, in the receiving chamber 4312 and the receiving chamber 4322 of the rotation joint 43, and in the bottom portion of the second heat-dissipation tube 44. The cooling liquid may be refrigerant.

When the electronic device 1 is in an operation state, the display 20 will be rotated to be inclined relative to the host 10, and thus the display 20 can be suitably watched and the input module 12 can be suitably used. Since the second heat-dissipation tube 44 and/or the connection portion 4323 of the second part 432 are disposed in the display 20, the display 20 makes the second part 432 rotate relative to the first part 431 when the display 20 is rotated by a user.

In this embodiment, the receiving chamber 4312 of the first part 431 keeps communicating with the receiving chamber 4322 of the second part 432. Therefore, during rotation of the display 20, or when the angle between the display 20 and the host 10 is changed, the cooling liquid can flow into the first heat-dissipation tube 42 or the second heat-dissipation tube 44 via the rotation joint 43.

Moreover, in this embodiment, the cooling liquid is refrigerant. When the electronic device 1 is not operated or the heat source 14 does not generate heat, the pressure in the second heat-dissipation tube 44 is atmospheric pressure. Therefore, it is hard for the cooling liquid in the heat-dissipation structure 40 to flow out of the heat-dissipation structure 40 via the rotation joint 43 due to the pressure in the second heat-dissipation tube 44.

Figure 4:
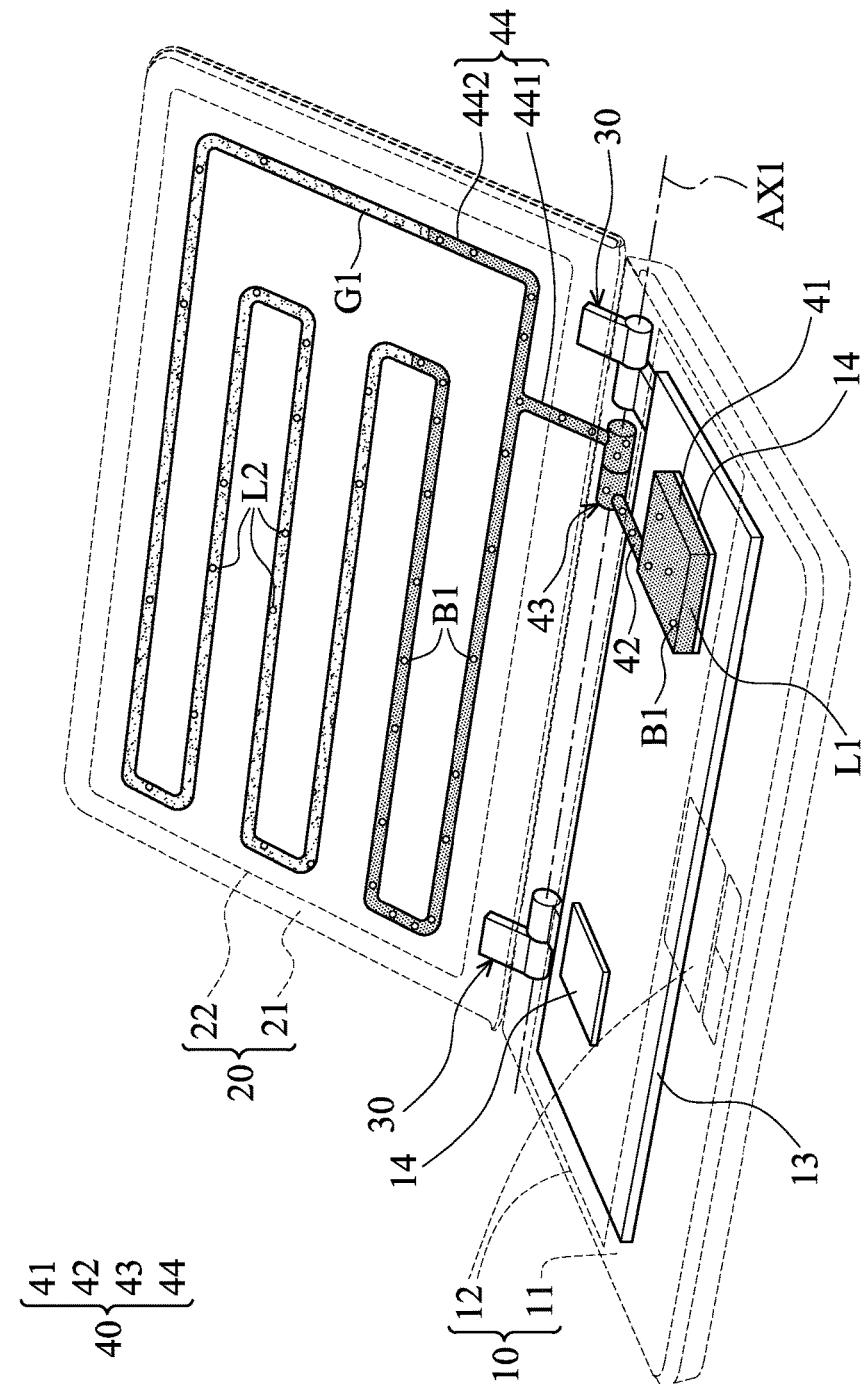
FIGS. 4 and 5 are schematic views of the electronic device during an operation process in accordance with some embodiments of the disclosure.
Figure 5:
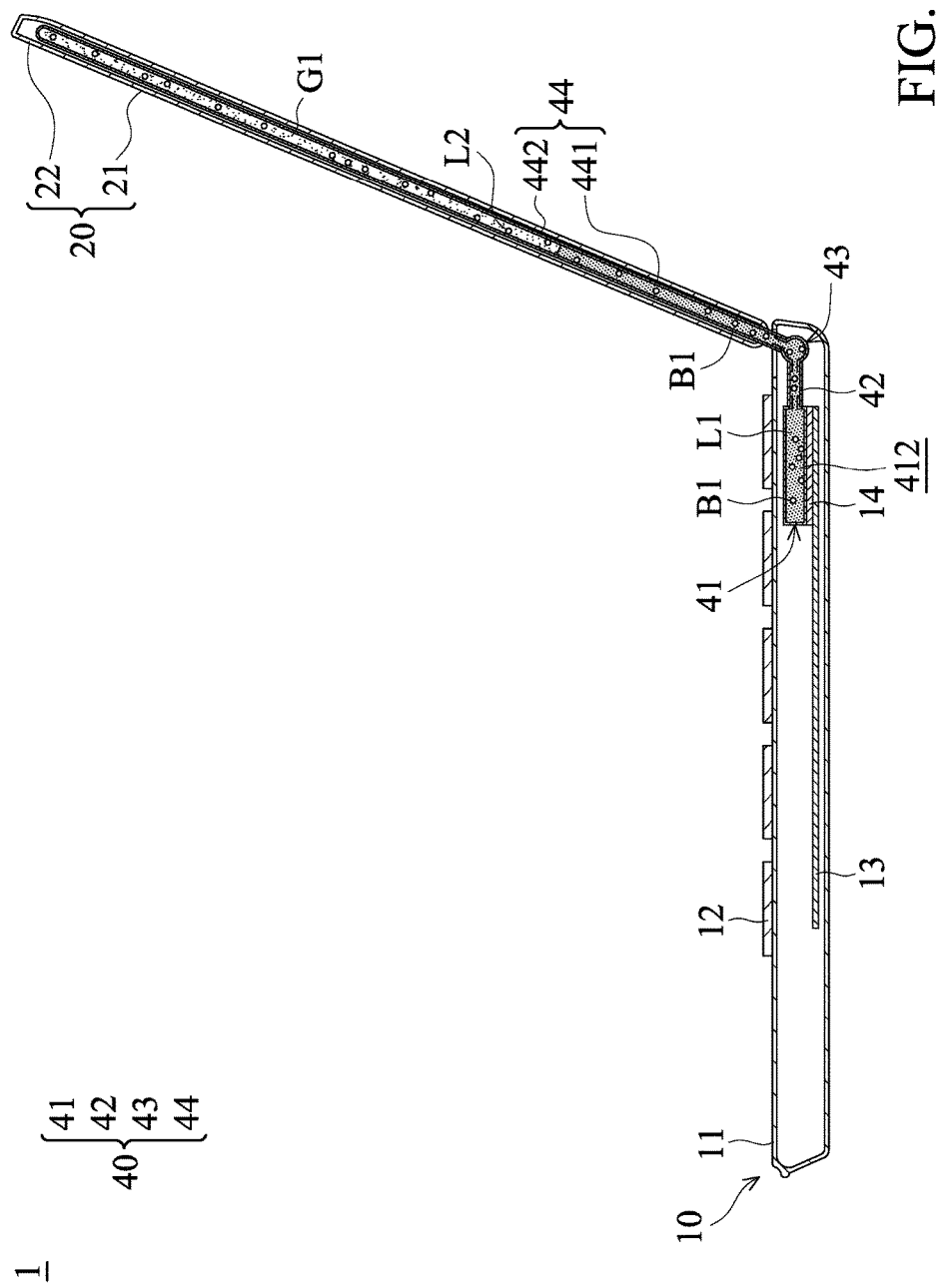

FIGS. 4 and 5 are schematic views of the electronic device 1 during an operation process in accordance with some embodiments of the disclosure. In this embodiment, the cooling liquid L1 is filled in the heat-dissipation element 41, in the first heat-dissipation tube 42, in the rotation joint 43, and in the bottom portion of the second heat-dissipation tube 44. In another embodiment, the cooling liquid L1 is filled in the connection section 441 of the second heat-dissipation tube 44, but may not be filled in the ring section 442 of the second heat-dissipation tube 44. In another embodiment, the cooling liquid L1 is not filled in the second heat-dissipation tube 44.

When the heat source 14 generates heat, the cooling liquid L1 in the heat-dissipation element 41 and/or the first heat-dissipation tube 42 is vaporized to the cooling gas G1. Since the cooling gas G1 is surrounded by the cooling liquid L1, the cooling gas G1 forms bubbles B1 in the cooling liquid L1. In other words, the bubbles B1 are filled with cooling gas G1.

Since the display 20 is inclined relative to the host 10 while the electronic device 1 is in an operational state, the second heat-dissipation tube 44 (in particular the top portion and the center portion of the second heat-dissipation tube 44) is higher than the heat-dissipation element 41, the first heat-dissipation tube 42, and the rotation joint 43. Therefore, the bubbles B1 enter into the bottom portion of the second heat-dissipation tube 44 via the first heat-dissipation tube 42 and the rotation joint 43, and move toward the top portion of the second heat-dissipation tube 44 due to the pressure of the cooling liquid L1.

When a bubble B1 leaves the cooling liquid L1, the cooling gas G1 flows toward the top portion of the second heat-dissipation element 41 because of the temperature of the cooling gas G1. Since the top portion of the second heat-dissipation element 41 is far from the heat source 14, the temperature of the top portion of the second heat-dissipation element 41 is lower than the temperature of the other portion of the heat-dissipation element 41 and/or the first heat-dissipation tube 42. Therefore, the cooling gas G1 located at the top portion or the center portion of the second heat-dissipation element 41 condenses to the cooling liquid L2.

The cooling liquid L2 located at the top portion and/or the center portion of the second heat-dissipation element 41 flows toward the bottom portion of the second heat-dissipation element 41 and/or the first heat-dissipation tube 42 by gravity, and is mixed with the cooling liquid L1 located at the bottom portion of the second heat-dissipation element 41 and/or the first heat-dissipation tube 42.

In this embodiment, the cooling gas G1 with heat can quickly leave the heat source 14 to an area with lower temperature (such as the top portion of the second heat-dissipation tube 44) by the cooling liquid L1 filled in the heat-dissipation element 41, the first heat-dissipation tube 42, and/or the rotation joint 43. Moreover, the cooling liquid L2 is cooled in the top portion (and/or the center portion) of the second heat-dissipation element 41 can automatically flow toward the bottom portion of the second heat-dissipation element 41 and/or the first heat-dissipation tube 42 by gravity, so as to complete a heat-dissipation cycle. Therefore, the heat-dissipation structure 40 of the embodiment does not operated by power or motor, so as to reduce the power consumed by the electronic device 1 and the manufacturing cost of the electronic device 1.

As shown in FIGS. 4 and 5, in this embodiment, the second heat-dissipation tube 44 includes a connection section 441 and a ring section 442. Two ends of the connection section 441 are respectively connected to the rotation joint 43 and the ring section 442. The ring section 442 extends along a curved path. The second heat-dissipation tube 44 is distributed in four edges and the center area of the display 20.

In some embodiments, the second heat-dissipation tube 44 can be distributed in one, two or three edges of the display 20. In some embodiments, the second heat-dissipation tube 44 is not distributed in the center area of the display 20.

The shape and the extension path of the second heat-dissipation tube 44 are not limited to FIG. 2. The structure of second heat-dissipation tube 44 can be varied according to design. For example, the second heat-dissipation tube 44 may be a Y-shaped structure or a liner structure.

Since the second heat-dissipation tube 44 is widely distributed in the display 20, the heat-dissipation efficiency of the heat-dissipation structure 40 is increased. Moreover, in the operation process of the electronic device 1, the temperature of the display 20 is generally lower than the temperature within the host 10. Therefore, the heat-dissipation efficiency of the heat-dissipation structure 40 is increased by disposing the second heat-dissipation tube 44 in the display 20.

Figure 6:
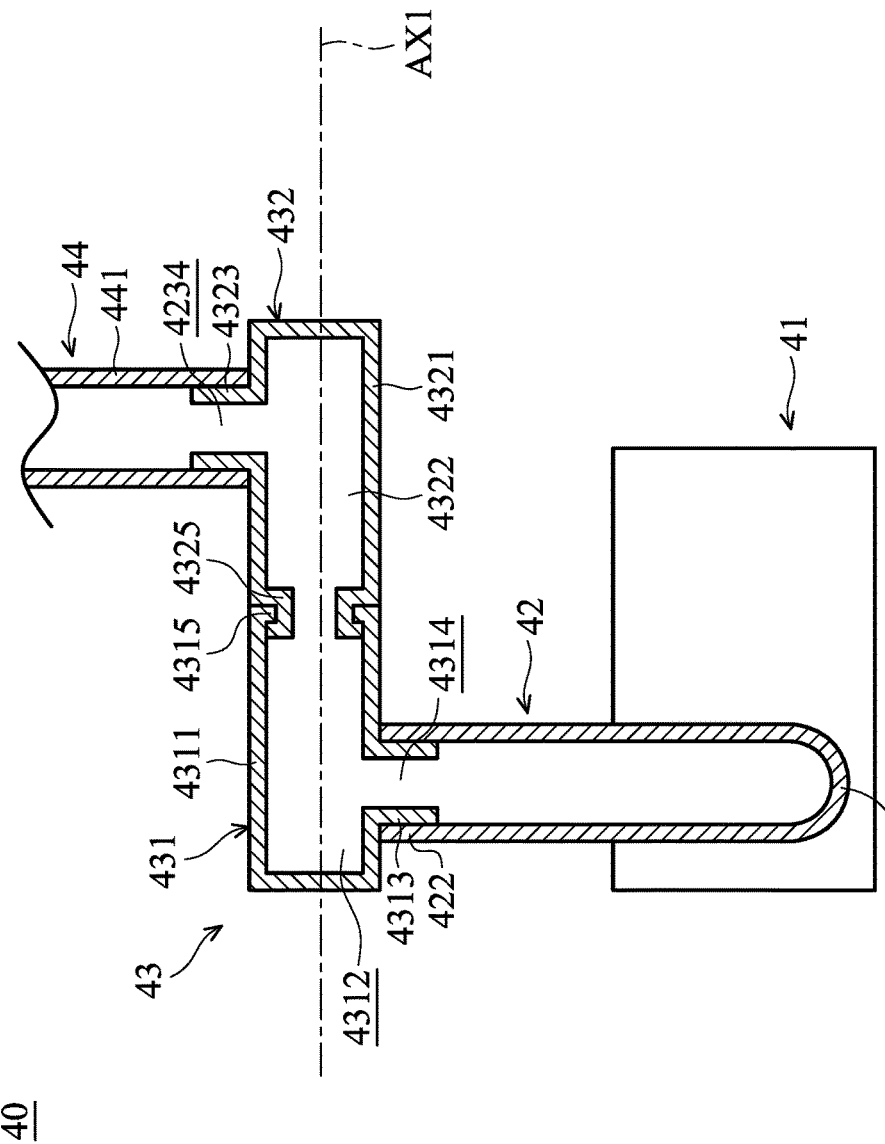
FIG. 6 is a cross-sectional view of the heat-dissipation structure 40 in accordance with another embodiment of the disclosure.

FIG. 6 is a cross-sectional view of the heat-dissipation structure 40 in accordance with another embodiment of the disclosure. The heat-dissipation element 41 may be a lump structure. For example, the heat-dissipation element 41 is a metal lump. The first heat-dissipation tube 42 extends into the heat-dissipation element 41, and fixed on the heat-dissipation element 41. The first heat-dissipation tube 42 can be connected to the heat source 14. The heat generated by the heat source 14 can be transmitted to the first heat-dissipation tube 42 and the heat-dissipation element 41. According, the manufacture of the heat-dissipation element 41 can be simplified according to this embodiment.

In conclusion, the heat-dissipation structure of the disclosure utilizes the second heat-dissipation tube disposed in the display to dissipate the heat by the heat source via the display, so as to increase the heat-dissipation efficiency and reduce the use of fans. Therefore, the length of the battery charge of the electronic device is increased, and the noise generated by fans during operation of the electronic device is decreased.

The disclosed features may be combined, modified, or replaced in any suitable manner in one or more disclosed embodiments, but are not limited to any particular embodiments.

While the invention has been described by way of example and in terms of preferred embodiment, it is to be understood that the invention is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device with a heat-dissipation structure, comprising:
   a host;
   a first heat-dissipation tube disposed in the host;
   a display pivoted on the host, and rotated about a rotation axis relative to the host;
   a rotation joint connected to the first heat-dissipation tube; and
   a second heat-dissipation tube disposed in the display, and connected to the rotation joint;
   wherein an end of the first heat-dissipation tube and an end of the second heat-dissipation tube are connected to a side of the rotation joint and extends substantially perpendicular to the rotation axis, and the rotation axis passes two opposite ends of the rotation joint,
   wherein the rotation joint has a chamber communicating with the first heat-dissipation tube and the second heat-dissipation tube, and a cooling liquid is filled in the chamber and the first heat-dissipation tube.

2. The electronic device as claimed in claim 1, wherein the rotation joint comprises:
   a first part connected to the first heat-dissipation tube; and
   a second part pivoted on the first part, and connected to the second heat-dissipation tube,
   wherein the second part is rotated about the rotation axis relative to the first part.

3. The electronic device as claimed in claim 1, wherein the cooling liquid is refrigerant.

4. The electronic device as claimed in claim 1, wherein when the display is inclined relative to the host, a top portion of the second heat-dissipation tube is higher than the first heat-dissipation tube.

5. The electronic device as claimed in claim 1, wherein the second heat-dissipation tube is distributed in four edges and a central area of the display.

6. The electronic device as claimed in claim 1, wherein the second heat-dissipation tube comprises a connection section and a ring section, wherein two ends of the connection section are respectively connected to the rotation joint and the ring section.

7. The electronic device as claimed in claim 6, wherein the ring section extends along a curved path.

8. The electronic device as claimed in claim 1, wherein the host comprises a heat source connected to the first heat-dissipation tube, wherein when the heat source generates heat, the cooling liquid is changed to a cooling gas flowing toward a top portion of the second heat-dissipation tube,
   wherein the cooling gas is located at the top portion of the second heat-dissipation element condenses to the cooling liquid flowing toward the first heat-dissipation tube.

9. The electronic device as claimed in claim 8, further comprising a heat-dissipation element, connected to the heat source and the first heat-dissipation tube.

10. The electronic device as claimed in claim 1, further comprising a hinge structure connected to the host and the display, wherein the display is pivoted on the host via the hinge structure.

11. The electronic device as claimed in claim 1, wherein the host comprises:
    a main housing;
    a motherboard disposed in the main housing;
    a heat source disposed on the motherboard and connected to the first heat-dissipation tube; and
    an input module disposed on a top surface of the main housing and electronically connected to the motherboard.

12. The electronic device as claimed in claim 1, wherein the display comprises:
    a display housing; and
    a display panel disposed on a display surface of the display housing,
    wherein the second heat-dissipation tube is located in the display housing at a rear side of the display panel.

13. The electronic device as claimed in claim 1, wherein the end of the first heat-dissipation tube and the end of the second heat-dissipation tube extend substantially perpendicular to the rotation axis in different directions while the display is inclined relative to the host.

* * * * *